United States Patent [19]

Yanik et al.

[11] 4,080,286
[45] Mar. 21, 1978

[54] HYDRODESULFURIZATION PROCESS EMPLOYING A GROUP IV-B PROMOTED CATALYST

[75] Inventors: Stephen Joseph Yanik, Valencia; Angelo Anthony Montagna, Monroeville; James Albert Frayer, Pittsburgh, all of Pa.

[73] Assignee: Gulf Research & Development Company, Pittsburgh, Pa.

[21] Appl. No.: 734,026

[22] Filed: Oct. 20, 1976

[51] Int. Cl.² .......................................... C10G 23/02
[52] U.S. Cl. ................................. 208/216; 252/458; 252/465; 252/469
[58] Field of Search ............... 208/216; 252/469, 458, 252/459

[56] References Cited

U.S. PATENT DOCUMENTS

| 2,799,661 | 7/1957 | DeRosset ......................... 208/216 R |
| 3,840,473 | 10/1974 | Beuther et al. ...................... 252/469 |
| 3,997,431 | 12/1976 | Beuther et al. ...................... 208/216 |

Primary Examiner—George Crasanakis

[57] ABSTRACT

An improved process for the hydrodesulfurization of hydrocarbons employing a catalyst comprising Group VI-B and Group VIII metals supported on a refractory oxide and promoted with a minor amount of titanium by contacting the refractory oxide with an aqueous solution of a titanium salt.

10 Claims, 1 Drawing Figure

HYDRODESULFURIZATION PROCESS EMPLOYING A GROUP IV-B PROMOTED CATALYST

BACKGROUND OF THE INVENTION

It is conventional in the art to effect sulfur removal from hydrocarbon stocks by subjecting them to treatment with hydrogen and at an elevated temperature and pressure while in contact with a catalyst containing hydrogenating components, either supported or unsupported. Typical of the catalysts suggested by the prior art are those containing Group VI-B or Group VIII metals, or their oxides or sulfides, as the hydrogenating components, with such hydrogenating components being supported on a variety of well-known carriers, such as, for example, alumina, kieselguhr, zeolitic molecular sieves and other materials having high surface areas.

A hydrodesulfurization process employing a catalyst composition promoted with titanium is described in U.S. Pat. No. 3,840,473. As described therein, titanium was added to the Group VI-B and Group VIII metal-containing catalyst composition by dissolving titanium tetrachloride in normal-heptane and impregnating the calcined support under substantially anhydrous conditions. Following this impregnation step, the catalyst composition was oven dried and calcined.

SUMMARY OF THE INVENTION

A titanium-containing hydrocarbon hydrodesulfurization catalyst composition of improved stability is obtained by contacting the non-zeolitic refractory oxide carrier containing the Group VI-B hydrogenating metal with an aqueous solution of the titanium salt in the preparation of the catalyst.

DESCRIPTION OF THE INVENTION

Figure 1:
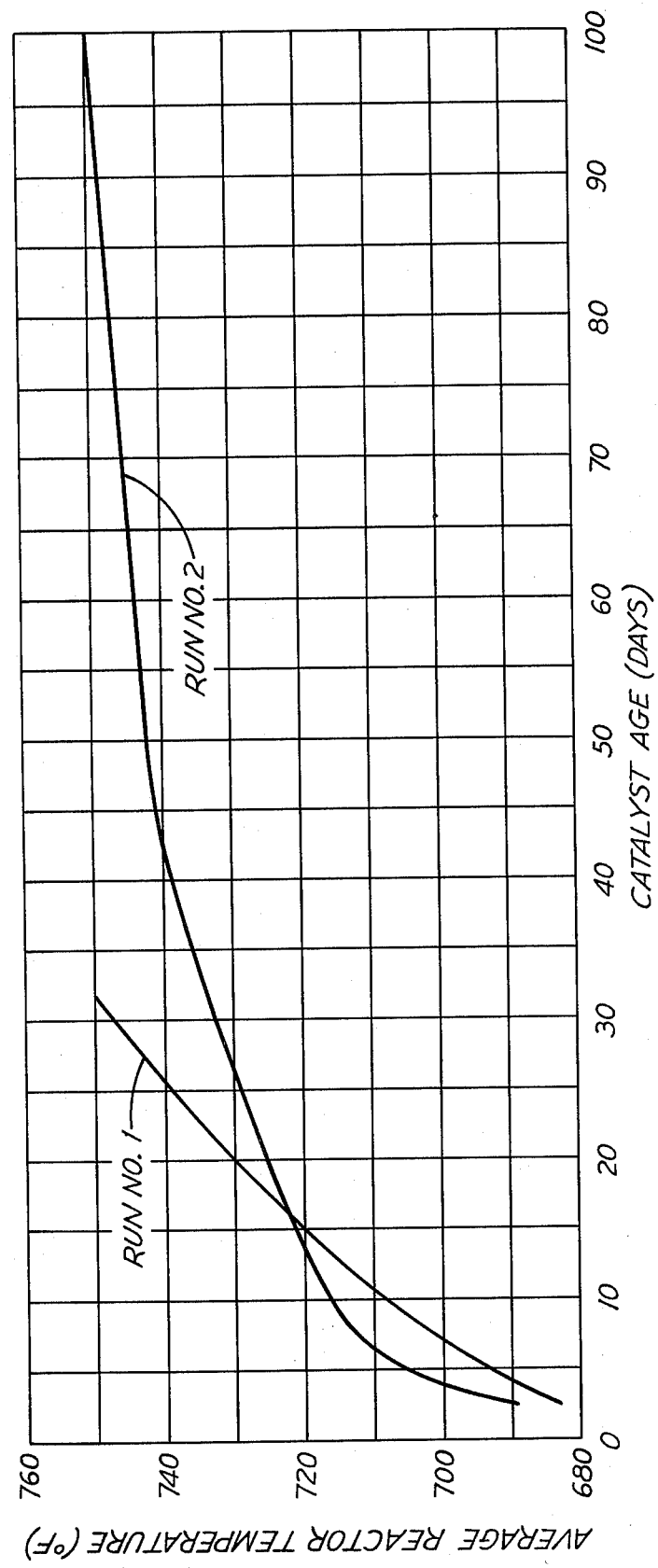
FIG. 1 illustrates the stability of the improved catalyst composition in the hydrodesulfurization of a residual hydrocarbon fuel oil.

The catalyst employed in the process of this invention must contain substantially no phosphates. While the presence of phosphates in the catalyst can be tolerated on the contaminant level, i.e., less than about 0.5% by weight and preferably less than about 0.1% by weight, it is desired that no phosphates be present at all. It has been observed that phosphate levels even as low as about 1% by weight have an adverse effect upon the catalytic activity and a phosphate content approaching 2% by weight is completely unacceptable.

The carrier or support employed in the catalyst of this invention can be any non-zeolitic refractory oxide having a surface area in excess of 3 square meters per gram, such as pure alumina, a silica-stabilized alumina containing up to about 5% by weight based upon the carrier of silica, silica gels, acid leached boro-silicate glass, and spinels, e.g. magnesium aluminate. Preferably, however, the carrier or support is silica-free. In addition to silica, the carrier or support preferably contains no more than a minor proportion (less than a total of 3.0 weight percent) of one or more of refractory metal oxides, other than alumina, such as, thoria, boria, titania, magnesia, zirconia, etc. The refractory oxide carrier is substantially zeolitic-free.

The hydrogenating components employed in our catalyst composition comprise a combination of Group VI-B and Group VIII metals in the sulfided form. Preferably, the hydrogenating components are employed in an atomic ratio of Group VIII metal to Group VI-B metal of at least 1:0.3 and more preferably at a ratio of at least 1:1.0. Generally, catalysts with a Group VIII to Group VI-B atomic ratio in excess of about 1:5 are not used and more preferably an atomic ratio of less than 1:2.5 is utilized. Further, the catalysts of our invention have a total Group VI-B plus Group VIII metals content of at least about 5% by weight based upon the total catalyst and preferably at least about 8% by weight. Generally, catalysts containing more than about 30% by weight hydrogenation metals are not employed. Suitably, the catalysts of this invention can be comprised of combinations of the iron group metals and Group VI-B metals such as molybdenum and tungsten. Of the iron group metals cobalt and nickel are preferred, particularly nickel, and of the Group VI-B metals molybdenum is preferred. Illustrative of particularly preferred combinations of hydrogenation metals are combinations of nickel-molybdenum and cobalt-molybdenum.

The catalysts of this invention are promoted with titanium. The titanium can be present in the catalyst composition as a metal, its oxide or sulfide. Accordingly, we employ catalysts containing at least 1% by weight titanium based upon the total catalyst weight and preferably containing at least about 2.5% by weight. While there does not appear to be any upper limit of titanium which can be employed, there does not appear to be any advantage to employing above about 10% by weight of titanium based upon the total weight.

In the preparation of the catalyst composition, the support or carrier is initially contacted with the Group VI-B metal, which, for example, can be deposited on the support from an aqueous solution of a salt such as ammonium molybdate, ammonium paramolybdate, molybdenum pentachloride or molybdenum oxylate. After drying, the impregnated catalyst can then be calcined to convert the deposited molybdate salt to the oxide.

The support or carrier containing the Group VI-B metal can then be contacted with an aqueous solution of a Group VIII metal salt followed by drying and calcining. If a second Group VIII metal is to be employed, the second Group VIII metal can be deposited simultaneously or sequentially in a like manner. Nitrates or acetates of the Group VIII metals are normally utilized although any water soluble salt which leaves no harmful residue can be employed.

If desired, the Group VIII metal and the Group VI-B metal can be deposited simultaneously on the support, but are preferably deposited in the sequence outlined above with intervening drying and calcining.

After depositing on the support the Group VI-B and the Group VIII metals, titanium can be deposited from an aqueous solution of a salt of titanium. Suitable titanium salts which can be utilized in preparing the catalyst composite include titanium trichloride, titanium oxalate, titanium trifluoride, and titanium tetrachloride. If titanium tetrachloride is employed, the aqueous carrier should preferably also include a concentration of ammonia sufficient to maintain the titanium tetrachloride dispersed throughout the aqueous phase. Following deposition of the titanium on the carrier, the catalyst containing the titanium is subjected to a conventional drying and calcination step. The deposition of the titanium on the support can precede or follow deposition of the Group VIII metal or metals. The Group VIII metals and titanium can also be deposited simultaneously from a single solution on the carrier containing the Group VI-B metal.

The hydrogenation or desulfurization components of the prepared catalyst composite are employed in the sulfided form. The catalyst can be presulfided after calcination, or after calcination and reduction by methods known in the art. For example, the presulfiding can be conducted by employing a hydrogen sulfide and hydrogen gaseous mixture at a temperature in the range of 500° to 700° F. (261° to 372° C.) and at an elevated pressure. Presulfiding can be conveniently effected at the beginning of an onstream period at the same conditions to be employed during the desulfurization process. The exact proportions of hydrogen and hydrogen sulfide are not critical. Additionally, presulfiding of the catalyst can be accomplished by employing a mercaptan or carbon disulfide utilizing methods known in the art.

The feed stocks suitable for employment in the hydrodesulfurization process of this invention include all naphtha and heavier liquid hydrocarbons. The feed stocks particularly suitable are those containing a substantial quantity of components, i.e., greater than 50% by volume, boiling above about 400° F. (204° C.). Such materials can be synthetic crude oils such as derived from shale oil, tar sands and coal or full petroleum crudes or any individual fractions thereof. Thus, for example, our feed stock can be an atmospheric topped crude or it can be a vacuum residual fraction boiling substantially above 950° F. (510° C.). Similarly, it can be a naphtha or any of the intermediate distillate fractions, such as, a furnace oil. The inventive process is particularly applicable to a feed stock containing a substantial quantity of residual components, asphaltic contaminants and metalliferous components.

In the hydrodesulfurization process, the feed stock is brought into contact with the above-defined catalyst composition maintained in a hydrodesulfurization zone operated at a temperature in the range from about 500° to about 1,000° F. (260° to 538° C.), preferably in the range from about 600° to about 800° F. (316° to 427° C.). The space velocity maintained in the hydrodesulfurization zone can be in the range from about 0.10 to about 10.0 volumes of feed stock per volume of catalyst per hour and preferably in the range from about 0.3 to about 5.0. Contact between the catalyst composition and the feed stock is conducted in the presence of a hydrogen feed rate of from about 500 to about 10,000 standard cubic feet per barrel of feed stock (14,160 to 283,200 liters per 159 liters of feed stock), and preferably at a hydrogen flow rate in the range from 1,000 to about 8,000 SCF/B (28,320 to 226,560 liters per 159 liters of feed stock).

The pressure employed in the hydrodesulfurization process can be in the range from about 100 to about 5,000 psig (7.02 to 352 kg/cm$^2$). When treating a distillate feed stock, i.e., a feed stock containing substantially no residual components, preferably a pressure in the range from about 200 to about 3,000 psig (14.00 to 210 kg/cm$^2$) is employed. When treating a residual-containing stock, such as, for example, a reduced crude (atmospheric tower bottoms) or a residual stock boiling above about 950° F. (510° C.), pressures in the range from about 250 to about 2,500 psig (17.6 to 176 kg/cm$^2$) are preferred.

In order to illustrate our invention, the following examples are presented although it is not intended that the invention should be limited to the specific embodiments presented therein.

EXAMPLE I

A catalyst was prepared employing a conventional method of incorporating therein a titanium promoter and the prepared catalyst utilized in the hydrodesulfurization of a fuel oil containing 1.0 weight percent sulfur. In the preparation of the catalyst, 500 cc. of a commercially available alumina was calcined in air for 16 hours at 1,000° F. (538° C). The weight of the calcined alumina was 309.5 grams. A first impregnation solution was prepared by dissolving 59.15 grams of ammonium paramolybdate and 26 cc. of ammonium hydroxide in 289.3 cc. of distilled water. This first impregnation solution was then employed to impregnate the calcined alumina by pouring the solution on the alumina with continuous mixing. After this first impregnation, the catalyst was oven dried for 16 hours at 250° F. (121° C.).

A second impregnation solution was prepared by dissolving 77.93 grams of Ni(NO$_3$)$_2$ . 6H$_2$O in 229.72 cc. of distilled water. This second impregnation solution was employed to impregnate the oven dried molybdenum containing material by pouring the second impregnation solution on the support with continuous mixing. After this second impregnation, the catalyst was oven dried at 250° F. (121° C.) for 16 hours and then calcined at 1,000° F. (538° C.) for 16 hours.

A third impregnation solution was prepared by dissolving 80.78 grams of titanium tetrachloride in 370 milliliters of n-heptane. This third impregnation solution was employed to impregnate the calcined molybdenum and nickel containing material under substantially anhydrous conditions. After the third impregnation, the catalyst was oven dried at 250° F. (121° C.) for 16 hours and calcined in air at 1,000° F. (538° C.) for 16 hours. The weight of the final catalyst was 399.0 grams and contained nominally 8% by weight molybdenum, 3% by weight nickel and 5% by weight titanium, all based on the total catalyst, to provide a Ni/Mo atomic ratio of about 1:1.6. Thereafter, the catalyst composition was presulfided employing a vacuum gas oil containing 2.29 weight percent sulfur and boiling between about 650° to 1,000° F. (343° to 593° C.). A hydrogen partial pressure of 2,000 psia (140 kg/cm$^2$) and a temperature of 650° F. (343° C.) was employed in the presulfiding step. The presulfiding was conducted at 1.0 LHSV space velocity for a period of 12 hours.

The catalyst, prepared as described above, was utilized in the hydrodesulfurization of a residual hydrocarbon fuel oil containing 1.0 weight percent sulfur with the fuel oil further characterized as follows:

| Gravity, ° API | 22.3 | |
|---|---|---|
| Nitrogen: wt. % | 0.18 | |
| ASTM Distillation: ° F. | | |
| 5% Recovered | 596 | (313° C) |
| 10% Recovered | 627 | (330.6° C) |
| 30% Recovered | 758 | (403° C) |
| 50% Recovered | 878 | (470° C) |

The operating conditions employed in the hydrodesulfurization run comprised a hydrogen pressure of 1,830 psia (128.10 kg/cm$^2$), a hydrogen feed rate of 4,750 scf/bbl (134,520 liters per 150 liters of feed stock) and a liquid hourly space velocity (LHSV) of 0.88. The hydrodesulfurization run was made to produce a product containing 0.3 weight percent sulfur with the initial operating temperature being about 680° F. (360° C.). The run was conducted for a period of 33 days and the results are illustrated in FIG. 1 (Run No. 1). At the end of the run a temperature of 750° F. (399° C.) was required to obtain a product containing 0.3 weight percent sulfur.

EXAMPLE II

In this example a catalyst was prepared by initially impregnating the alumina support of Example I with a first and second impregnation solutions in the manner described in Example I. A third impregnation solution was prepared by dissolving 322.40 grams of 20.0 weight percent titanium trichloride solution in 27.25 grams of distilled water. After the third impregnation the catalyst was oven dried at 250° F. (121° C.) for 16 hours and followed by calcining in air at 1,000° F. (538° C.) for 16 hours. The weight of the final catalyst awas 399.0 grams and contained nominally 8% by weight molybdenum, 3% by weight nickel, and 5% by weight titanium all based on the total catalyst, to provide a nickel-molybdenum atomic ratio of about 1:1.6. Thereafter the catalyst composition was presulfided employing a furnace oil containing 1.0 weight percent sulfur and boiling between about 375° to 650° F. (190.6 to 343.3° C.) with 2,000 ppm of sulfur added as carbon disulfide. Presulfiding conditions of hydrogen partial pressure of 200 psia (14.00 kg/cm$^2$), a temperature of 400° F. (204.4° C.), a space velocity of 1.0 LHSV and a presulfiding time of 12 hours were employed.

The catalyst, prepared as described above, was utilized in the hydrodesulfurization of fuel oil similar to that of Example I employing operating conditions comprising a hydrogen pressure of 1,980 psia (138.60 kg/cm$^2$), a hydrogen feed rate of 4,000 scf/bbl (113,280 liters per 159 liters of feed stock) and a LHSV of 1.0. As in Example I, the hydrodesulfurization run, made under essentially the same operating severity as Run No. 1 of Example I, was conducted to produce a product containing 0.3 weight percent sulfur with the initial operating temperature being about 685° F. (363° C.). The run was conducted for an extended period of time and the results of the first 100 days are illustrated in FIG. 1 (Run No. 2). At the end of 100 days, a temperature of 750° F. (399° C.) was required to obtain a product containing 0.3 weight percent sulfur.

A comparison of Runs 1 and 2 illustrates that the catalyst prepared by the inventive process was significantly more stable than that of the catalyst produced by the conventional method of manufacture. The catalyst of Run No. 2 at the end of 33 days of operation had a temperature advantage of 16° F. (9° C.) and did not reach 750° F. (399° C.) temperature requirement until 100 days of operation, compared to 33 days for Run No. 1.

Although the invention has been described with reference to specific embodiments, references, and details, various modifications and changes will be apparent to one skilled in the art and are contemplated to be embraced in this invention.

We claim:

1. In a process for the hydrodesulfurization of a sulfur-containing hydrocarbon stock selected from the group consisting of naphtha and heavier hydrocarbons which comprises contacting the hydrocarbon stock under hydrodesulfurization conditions with a catalsyt substantially free of phosphates and consisting essentially of a hydrogenating metal selected from Group VI-B and a hydrogenating metal selected from Group VIII, both hydrogenating metals being in a sulfided form, supported on a non-zeolitic refractory oxide carrier and promoted with from about 1 to about 10 weight percent of a Group IV-B metal by the addition of the Group IV metal to said carrier after calcination of said carrier; the improvement which comprises in the preparation of said catalyst the step of adding the titanium to said carrier by contacting said carrier with an aqueous solution of a titanium salt.

2. The process of claim 1 wherein said hydrodesulfurization conditions comprise a temperature in the range from about 500° to about 1,000° F., a pressure from about 100 to about 5,000 psig, a liquid hourly space velocity from about 0.10 to about 10.0 volumes of hydrocarbon stock per volume of catalyst per hour and a hydrogen feed rate from about 500 to about 10,000 standard cubic feet of hydrogen per barrel of hydrocarbon stock.

3. The process of claim 1 wherein said hydrocarbon stock contains greater than 50 percent by volume of materials boiling above about 400° F.

4. The process of claim 3 wherein the hydrocarbon stock contains substantial quantities of residual components, asphaltic materials and metalliferous contaminants.

5. The process of claim 1 in which the atomic ratio of Group VIII to Group VI metals is in the range of 1:0.3 to about 1:5.

6. The process of claim 1 wherein said carrier is contacted with said aqueous solution of a titanium salt after said Group VI and Group VIII hydrogenating metals have been composited with said carrier.

7. The process of claim 1 wherein said carrier is contacted with said aqueous solution of a titanium salt after said Group VI hydrogenating metal has been composited with said carrier.

8. The process of claim 1 wherein said carrier is contacted with said aqueous solution of a titanium salt and a Group VIII metal salt after said Group VI hydrogenation metal has been composited with said carrier.

9. The process of claim 1 wherein said carrier is contacted with said aqueous solution of a titanium salt simultaneously with compositing said Group VI and Group VIII hydrogenating metals with said carrier.

10. The process of claim 1 wherein said non-zeolitic refractory oxide carrier is selected from the group consisting of alumina and silica-stabilized alumina.

* * * * *